US012208634B2

(12) United States Patent
Lanigan

(10) Patent No.: US 12,208,634 B2
(45) Date of Patent: Jan. 28, 2025

(54) BIDIRECTIONAL PRINTER RIBBON SUPPLY SYSTEM

(71) Applicant: ZEBRA TECHNOLOGIES CORPORATION, Lincolnshire, IL (US)

(72) Inventor: Daniel P. Lanigan, Elgin, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/204,857

(22) Filed: Jun. 1, 2023

(65) Prior Publication Data

US 2023/0302838 A1 Sep. 28, 2023

Related U.S. Application Data

(63) Continuation of application No. 17/859,394, filed on Jul. 7, 2022, now Pat. No. 11,691,448, which is a continuation of application No. 16/435,181, filed on Jun. 7, 2019, now Pat. No. 11,413,893.

(51) Int. Cl.

| | |
|---|---|
| ***B41J 33/22*** | (2006.01) |
| ***B41J 33/00*** | (2006.01) |
| ***B41J 33/44*** | (2006.01) |
| ***B41J 35/08*** | (2006.01) |

(52) U.S. Cl.
CPC ............. *B41J 33/22* (2013.01); *B41J 33/003* (2013.01); *B41J 33/44* (2013.01); *B41J 35/08* (2013.01)

(58) Field of Classification Search
CPC . B41J 33/22; B41J 33/002; B41J 33/44; B41J 33/42; B41J 35/08; B41J 17/32; B41J 17/02
USPC ....... 400/236.2, 218, 221, 221.1, 221.2, 237
See application file for complete search history.

(56) References Cited

U.S. PATENT DOCUMENTS

| | | | | |
|---|---|---|---|---|
| 5,284,396 A | | 2/1994 | Masumura et al. | |
| 5,326,182 A | * | 7/1994 | Hagstrom | B41J 33/16 400/234 |
| 5,415,482 A | | 5/1995 | Poole et al. | |
| 5,857,786 A | * | 1/1999 | Randolph | B41J 35/28 400/234 |
| 6,109,801 A | | 8/2000 | Mabit | |
| 6,260,834 B1 | | 7/2001 | Colonel et al. | |
| 6,848,845 B2 | | 2/2005 | Poole | |
| 7,071,961 B2 | | 7/2006 | Ullenius et al. | |

FOREIGN PATENT DOCUMENTS

JP 11138929 A * 5/1999

OTHER PUBLICATIONS

English abstract of JP 11-138929A to Saito, publication date May 25, 1999. (Year: 1999).*

* cited by examiner

*Primary Examiner* — Leslie J Evanisko

(57) ABSTRACT

A bidirectional ribbon supply system for a printer includes: a shaft supported by a frame of the printer, the shaft to rotate about an axis; a pulley affixed to the shaft; and a bias member coupled between the frame and the pulley to apply a force to the pulley in either of a first or second direction responsive to rotation of the pulley in the other of the first or second direction, wherein rotation of a spindle supported on the shaft in the first direction dispenses inside-coated ribbon toward a printhead, and rotation of the spindle in the second direction dispenses outside-coated ribbon toward the printhead.

18 Claims, 10 Drawing Sheets

BIDIRECTIONAL PRINTER RIBBON SUPPLY SYSTEM

RELATED APPLICATION

This application is a continuation of U.S. patent application Ser. No. 17/859,394, filed on Jul. 7, 2022, which is a continuation of U.S. patent application Ser. No. 16/435,181, filed on Jun. 7, 2019, each of which are incorporated by reference herein in their entirety.

BACKGROUND

Printers, such as thermal transfer printers, may contain a supply of ink-carrying ribbon that is transferred to media (e.g. paper, cards or the like) at a printhead. The supply of ribbon may be provided in the form of a spool. Spools of such ribbon may be manufactured in various sizes and configurations, and some printers are unable to accommodate different spool sizes and/or configurations.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
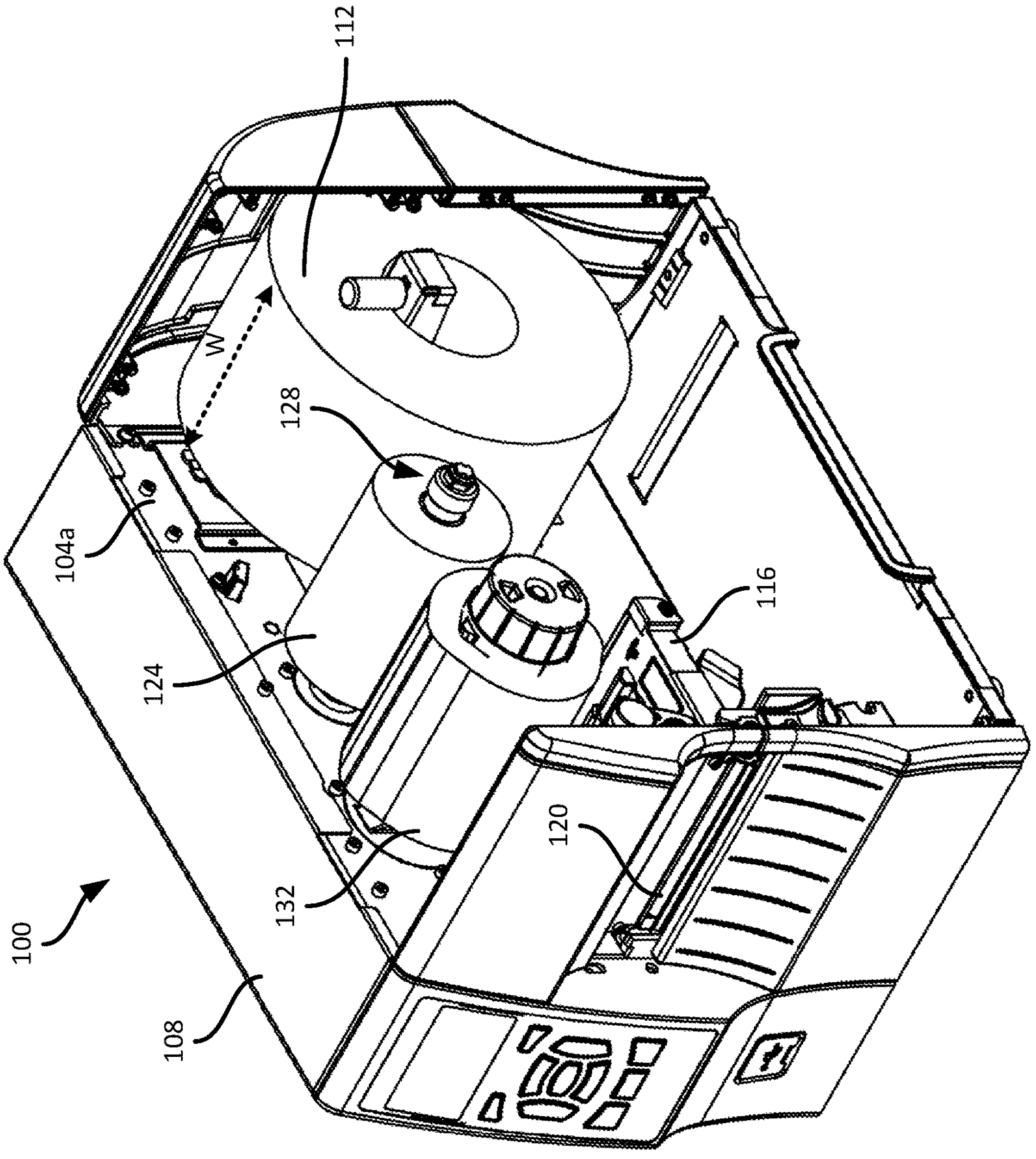
FIG. 1 is an isometric view of a printer from the top and the front.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a bidirectional ribbon supply system for a printer, comprising: a shaft supported by a frame of the printer, the shaft to rotate about an axis; a pulley affixed to the shaft; and a bias member coupled between the frame and the pulley to apply a force to the pulley in either of a first or second direction responsive to rotation of the pulley in the other of the first or second direction, wherein rotation of a spindle supported on the shaft in the first direction dispenses inside-coated ribbon toward a printhead, and rotation of the spindle in the second direction dispenses outside-coated ribbon toward the printhead.

Additional examples disclosed herein are directed to a printer, comprising: a frame supporting a printhead; a ribbon supply spool; a bidirectional ribbon supply system, including: a shaft supported by the frame and carrying the ribbon supply spool, the shaft to rotate about an axis; a pulley affixed to the shaft; and a bias member coupled between the frame and the pulley to apply a force to the pulley in either of a first or second direction responsive to rotation of the pulley in the other of the first or second direction, wherein rotation of a spindle supported on the shaft in the first direction dispenses inside-coated ribbon from the ribbon supply spool toward the printhead, and rotation of the spindle in the second direction dispenses outside-coated ribbon toward the printhead.

Further examples disclosed herein are directed to a method in a printer, including: supporting a shaft on a frame of the printer to rotate about an axis, wherein a pulley is affixed to the shaft; causing rotation of a ribbon supply spool carried by a spindle supported on the shaft in either of a first or second direction, wherein rotation of the ribbon supply spool in the first direction dispenses inside-coated ribbon toward a printhead, and wherein rotation of the ribbon supply spool in the second direction dispenses outside-coated ribbon toward the printhead; at the bias member, responsive to rotation of the ribbon supply in either of the first or second direction, applying a force to the pulley in the other of the first or second direction.

FIG. 1 depicts an example printer 100 constructed in accordance with the teachings of this disclosure. The printer 100 includes a frame that, in the present example, includes a main frame 104*a* visible in FIG. 1, and a subframe discussed further below. In other examples, the frame can include fewer parts than the main frame 104*a* and the above-mentioned subframe. In further examples, the frame can include more parts than the main frame 104*a* and the subframe. The frame supports the components of the printer 100, including an exterior housing 108 supported by the main frame 104*a*, of which one side and a portion of the top are omitted in FIG. 1 to reveal certain internal components of the printer 100.

The printer 100 is configured to apply indicia to media such as paper, labels, cards (e.g. identity cards) or the like. In the illustrated example, the media is provided in the form of a media spool 112, such as a continuous roll of paper, a roll of webbing supporting a plurality of labels, or the like. When the printer 100 is in operation, the media is fed from the media spool 112 toward a printhead assembly 116 for application of the above-mentioned indicia. Following impression, the media exits the housing 108 via an outlet 120.

The printer 100, in the present example, is a thermal transfer printer. Therefore, the indicia applied to the media at the printhead 116 are applied via the transfer of thermally sensitive ink from an ink-bearing ribbon. The printhead 116, as will be apparent to those skilled in the art, applies heat to the media and the above-mentioned ribbon as the media and the ribbon traverse the printhead, transferring the ink from the ribbon to the media at desired locations on the media to produce the above-mentioned indicia.

The ribbon is supplied to the printhead 116 from a ribbon spool 124 mounted on a bidirectional ribbon supply system 128, to be discussed in greater detail below. Following impression at the printhead 116, used ribbon is collected on a take-up roller 132, and when the spool 124 is depleted, the spool 124 may be removed and replaced by another spool.

The printer 100 can accommodate media spools 112 having different widths W (e.g. the media spool 112 may be a range of label widths supported by the printer 100, e.g. a spool of three-inch wide labels, or a spool of 4-inch wide labels). The ribbon spool 124 preferably has a width matching that of the media spool 112. Therefore, the ribbon supply system 128 has various features enabling the ribbon supply system 128 to accommodate ribbon spools 124 of different widths, as will be discussed below.

In addition, the ribbon spool 124 may be provided in various configurations, differing for example in the placement of the ink on the ribbon. In particular, some ribbon spools 124 carry ribbon referred to as outside-coated ribbon, in which the layer of ink faces away from the center of the spool 124. Other ribbon spools 124 carry ribbon referred to as inside-coated ribbon, in which the layer of ink faces toward the center of the spool 124. In order to accommodate both of the above-mentioned ribbon configurations, the ribbon supply system 128 also includes features enabling the ribbon spool 124 to rotate in either direction. The ribbon supply system 128 therefore enables the supply of both outside- and inside-coated ribbon to the printhead 116 in a consistent orientation, while minimizing or avoiding modifications to the printhead 116 itself, and to the take-up roller 132.

Figure 2:
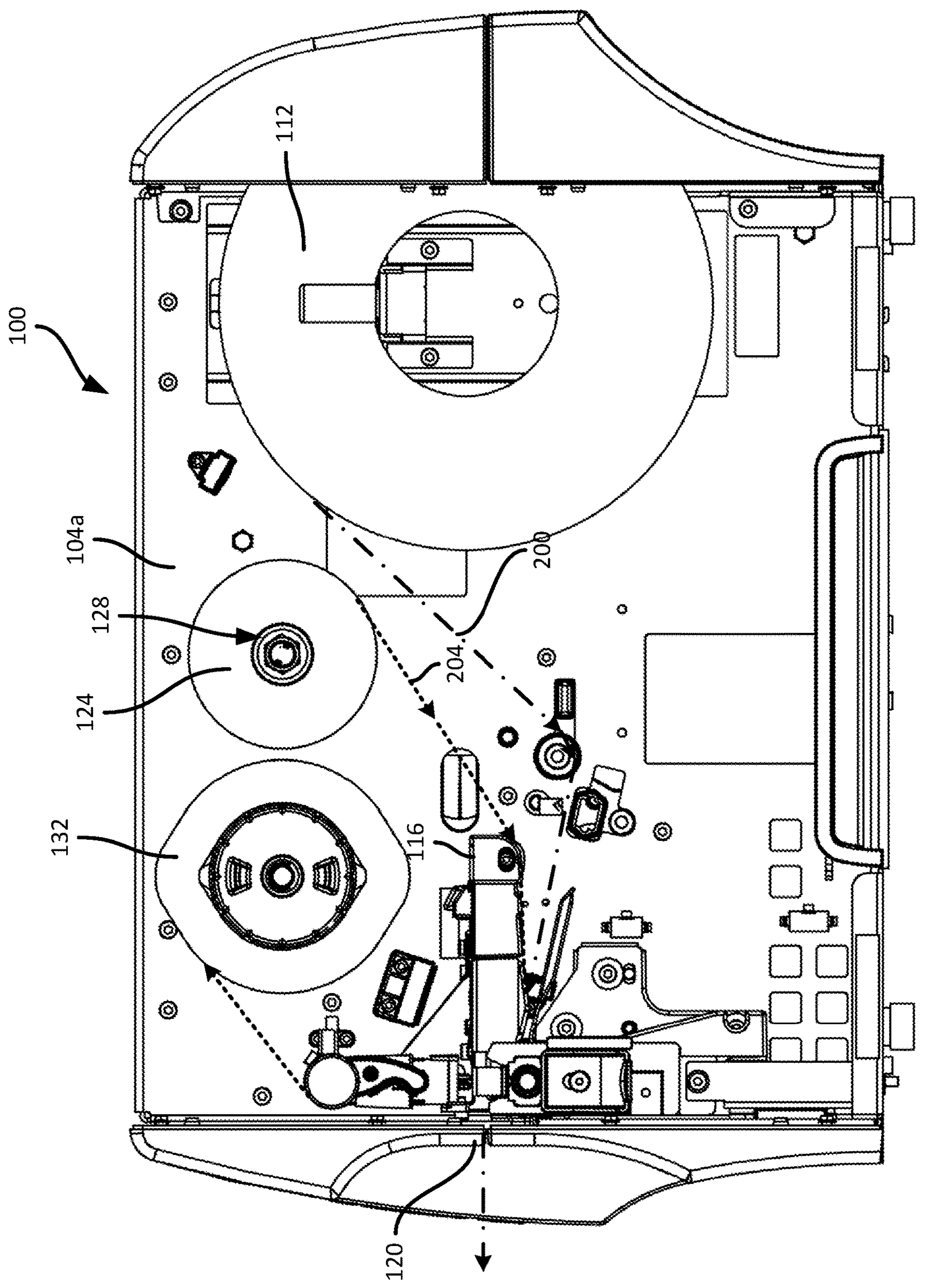
FIG. 2 is a side view of the printer of FIG. 1 illustrating a first ribbon path.

Turning to FIG. 2, a side view of the printer 100 is shown, illustrating paths travelled by media from the media spool 112, and by outside-coated ribbon from the ribbon spool 124. In particular, the media travels from the media spool 112 (which, in the orientation illustrated in FIG. 2, rotates counter-clockwise to dispense the media) along a media path 200 toward the printhead 116 and, following impression at the printhead 116, to the outlet 120. The ribbon, meanwhile, travels from the ribbon spool 124 along a ribbon path 204 to the printhead 116. As the ribbon in the illustrated example is outside-coated, the ribbon path 204 orients the layer of ink carried on the ribbon to face the media travelling along the media path 200 when the ribbon and the media arrive at the printhead 116. Specifically, in the orientation illustrated in FIG. 2, the ribbon spool 124 rotates clockwise and the ink faces generally downwards, towards the media path 200.

As will now be apparent, if the ribbon were inside-coated, clockwise rotation of the ribbon spool 124 to dispense the ribbon along the ribbon path 204 would cause the ink layer to face generally upwards, away from the media path 200. As a result, the ink would not come into contact with the media. The ribbon supply system 128 is therefore configured to also enable rotation of the ribbon spool 124 in the opposite direction (i.e. counter-clockwise, in the illustrated orientation) when dispensing inside-coated ribbon.

Figure 3:
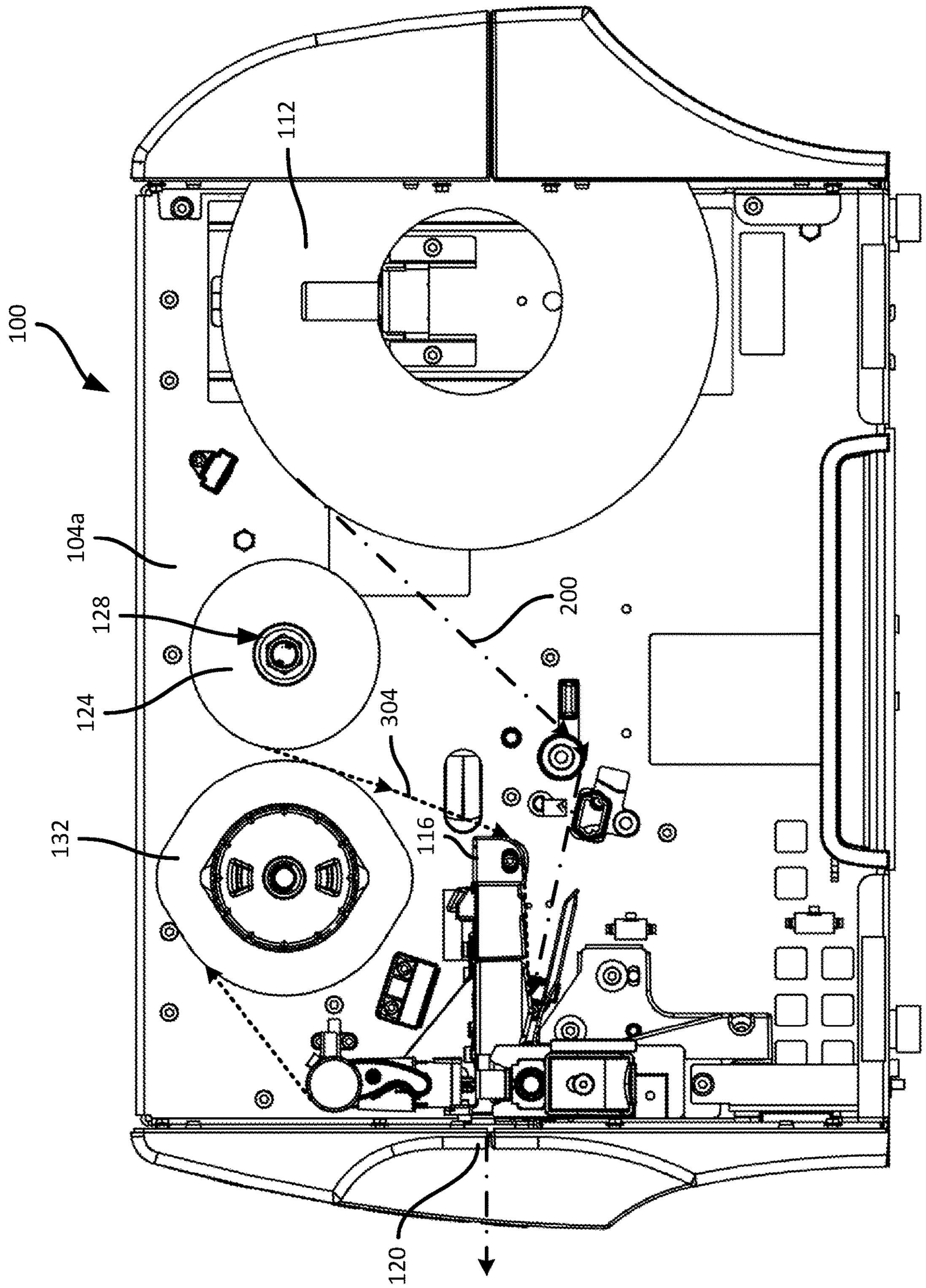
FIG. 3 is a side view of the printer of FIG. 1 illustrating a second ribbon path.

As shown in FIG. 3, for inside-coated ribbon the ribbon spool 124 rotates counter-clockwise, dispensing the ribbon along a ribbon path 304 such that the ink layer arrives at the printhead 116 facing toward the media path 200. The media path 200 remains unchanged from that illustrated in FIG. 2. In addition, the take-up roller 132 need not be reconfigured depending on the direction of rotation of the ribbon spool 124. Instead, the take-up roller 132 rotates clockwise as illustrated in FIGS. 2 and 3 to collect used ribbon from either configuration of ribbon spool 124. In other words, to install either configuration of ribbon spool 124 in the printer 100, an operator need only route the ribbon through the printhead 116 to the take-up roller 132 according to the appropriate ribbon path (204 or 304), and the remainder of the operation of the printer 100 is unchanged.

Figure 4:
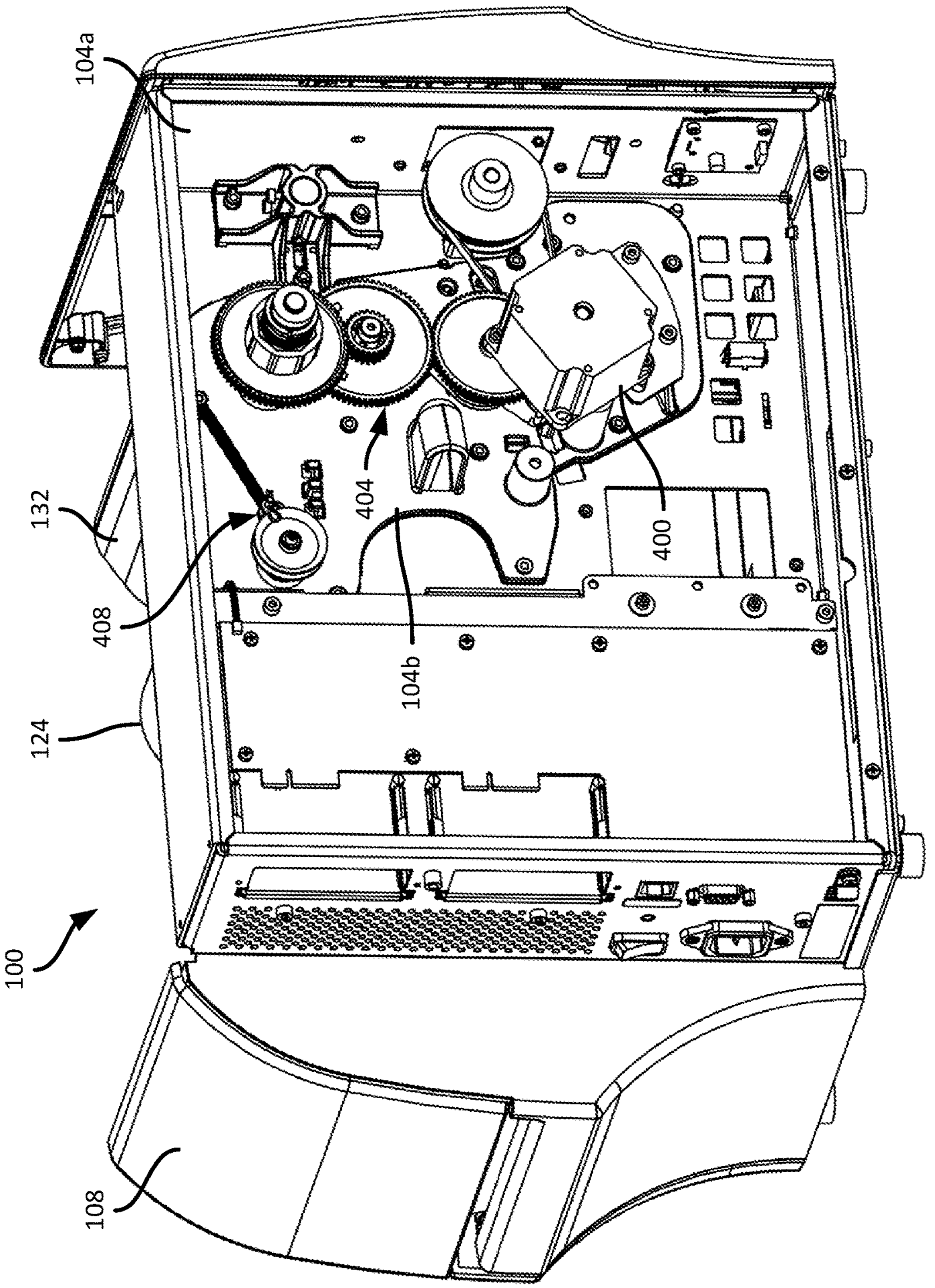
FIG. 4 is an isometric view of the printer of FIG. 1 from the top and the rear.

Rotation of the ribbon spool 124 on the ribbon supply system 128 is passive in the present example. Rotation of the media spool 112 may also be passive, however the particulars of dispensing media from the media spool 112 are outside the scope of the present disclosure and will therefore not be discussed herein. Referring to FIG. 4, the take-up roller 132 is driven by a motor 400 and a gear train 404. The motor 400, gear train 404, and various other components discussed herein, are supported by a subframe **104*b* component of the frame of the printer 100. The take-up of ribbon by the take-up roller 132 therefore drives rotation of the ribbon spool 124 on the ribbon supply system 128. To maintain a desired level of tension in the ribbon dispensed from the ribbon spool 124, the ribbon supply system 128 includes a bidirectional tensioning mechanism 408**, as will be discussed in greater detail below.

Thus, the ribbon supply system 128 enables the printer 100 to accommodate different configurations of ribbon spool 124, by permitting the ribbon spool 124 to rotate in opposite directions depending on the ribbon spool configuration, and to apply a desired level of tension in the ribbon for either configuration. The components and operation of the ribbon supply system 128 will now be discussed in greater detail.

Figure 5:
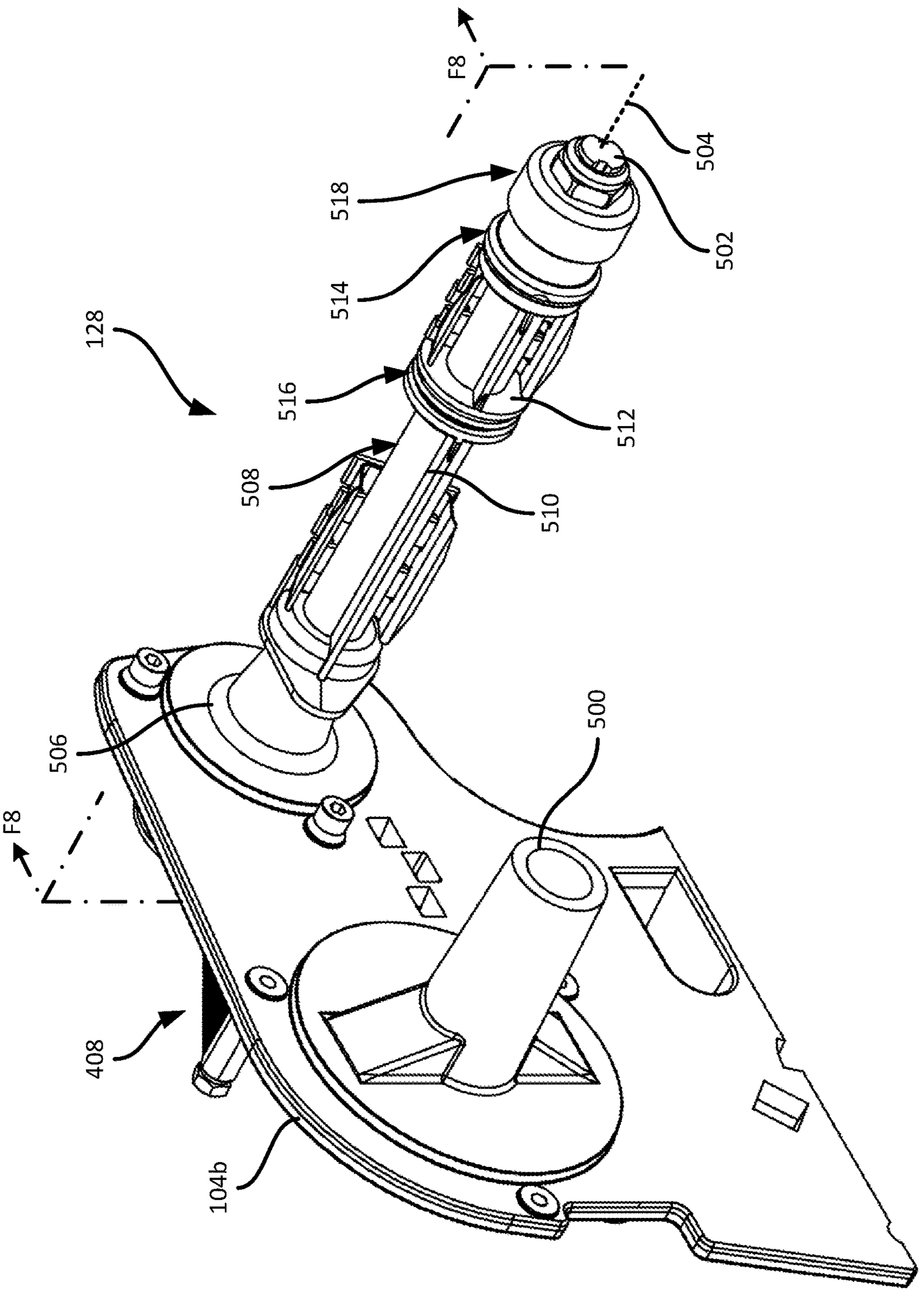
FIG. 5 is an isometric view of a ribbon supply system of the printer of FIG. 1.

Referring to FIG. 5, the ribbon supply system 128 is shown along with a portion of the subframe **104*b*. Aside from an axle 500 for the take-up roller 132, the other components of the printer 100, including the ribbon spool 124, are omitted from FIG. 5. The ribbon supply system 128, as will be discussed in further detail below, includes a shaft 502 supported by the subframe 104*b* for bidirectional rotation about an axis 504. In particular, the shaft 502 is supported by a channel defined within a channel portion 506 of the subframe 104*b*. The ribbon supply system 128 also includes a spindle assembly 508 (also referred to herein simply as the spindle 508) configured to carry the ribbon spool 124 (not shown in FIG. 5**, as noted above).

The spindle 508 is supported on the shaft 502 for rotation about the axis 504. As will be seen below, the spindle 508 can rotate about the axis 504 with the shaft 502, as well as independently from the shaft 502. The direction of rotation of the spindle 508 is determined by the configuration of the ribbon spool 124. If the ribbon spool 124 is a spool of outside-coated ribbon, the spindle 508 rotates about the axis 504 in a first direction (clockwise, in the illustrated orientation). If, on the other hand, the spool 124 is a spool of inside-coated ribbon, the spindle 508 rotates about the axis 504 in a second direction (counter-clockwise, in the illustrated orientation). As noted above, the ribbon supply system 128 is passively driven in the present example. The direction of rotation of the shaft 502 and the spindle 508 is therefore dictated by the orientation in which the ribbon spool 124 is mounted on the spindle 508. When the ribbon spool 124 is mounted as shown in FIG. 2 (for outside-coated ribbon), operation of the motor 400 (see FIG. 4) to drive the take-up roller 132 pulls the ribbon and drives the spindle 508 clockwise. When the ribbon spool 124 is mounted as shown in FIG. 3 (for inside-coated ribbon), operation of the motor 400 to drive the take-up roller 132 pulls the ribbon and drives the spindle 508 counter-clockwise.

The tensioning mechanism 408 mentioned earlier applies a torque to the shaft 502 in the direction opposite the current direction of rotation of the shaft 502. That is, when the shaft rotates clockwise, the tensioning mechanism 408 applies a counter-clockwise torque to the shaft 502. As a result, the tensioning mechanism 408 resists rotation of the shaft 502 and the spindle 508 to maintain a desired level of tension in the ribbon dispensed from the spool 124.

The ribbon supply system 128 also includes a clutch 514 configured to transmit rotation of the spindle 508 (driven passively from the take-up roller 132, as noted above) to the shaft 502. Whether the spindle 508 rotates with the shaft 502, or independently of the shaft 502 (that is, with the shaft 502 remaining substantially stationary while the spindle 508 rotates about the shaft 502) is determined by an amount of torque applied to the shaft 502 by the tensioning mechanism 408. When the torque reaches a predefined threshold determined by the clutch 514, the clutch 514 begins to slip and the spindle 508 continues to rotate while the shaft 502 remains stationary. This arrangement allows the tensioning mechanism 408 to increase the applied torque until the combination of the applied torque and friction from slipping of the clutch 514 applies a desired tension to the ribbon, and then to maintain that desired tension. The operation of the tensioning mechanism will be described in greater detail below.

As also mentioned earlier, ribbon spools 124 of different widths may be installed in the printer 100. Typically, the desired tension applied to the ribbon decreases as the width of the ribbon spool decreases. In the present example, the spindle 508 therefore includes a plurality of spindle segments. In particular, the spindle 508 includes a proximal spindle segment 510, closer to the channel portion 506 of the subframe 104*b*, and a distal spindle segment 512, further from the channel portion 506. In other examples, the spindle 508 includes only a single segment, or a greater number of segments than the two segments shown in FIG. 5. The segments 510 and 512 enable the ribbon supply system 128 to accommodate at least two different widths of ribbon spool 124, such as a first ribbon spool 124 with a width equal to that of the proximal segment 510 (e.g. about 2.5 inches), and a second ribbon spool 124 with a width equal to that of both segments 510 and 512 together (e.g. about 4 inches). When the spindle 508 includes more than one segment, the system 128 also includes an auxiliary clutch 516 between the proximal and distal segments 510 and 512 (in embodiments with three segments, two auxiliary clutches are implemented).

When a spool 124 having a width sufficient to be carried by both segments 510 and 512 is installed, the auxiliary clutch 516 is inactive, and the clutch 514 determines when the spindle 508 begins rotating independently of the shaft 502. When a spool 124 having a width sufficiently small to be accommodated solely on the proximal segment 510 is installed, however, the auxiliary clutch 516 determines when the proximal segment 510 begins rotating independently of the shaft 502 and the distal segment 512. The clutch 514, therefore, defines a greater threshold for the above-mentioned torque than the auxiliary clutch 516.

The thresholds applied by the clutch 514 and the auxiliary clutch 516 can be tuned, in the illustrated example, by a tension setting mechanism 518 that applies a variable compressive force along the axis 504 from the tension setting mechanism 518 towards the subframe 104*b*. The greater the compressive force applied by the tension setting mechanism 518, the higher the thresholds applied by the clutches 514 and 516 (that is, the higher the torque applied by the tensioning mechanism 408 before the spindle 508 begins rotating independently of the shaft 502).

Figure 6:
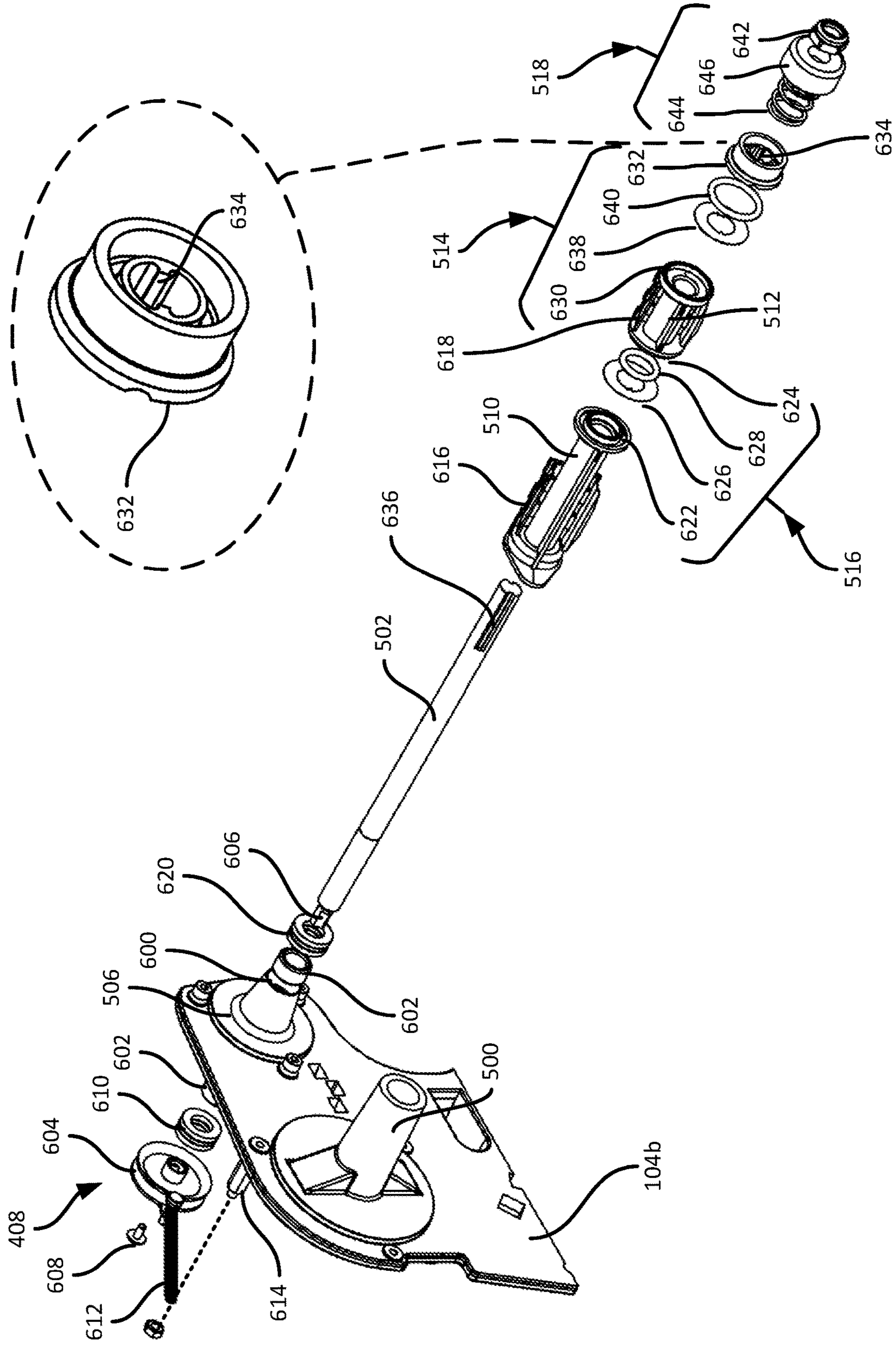
FIG. 6 is an exploded view of the ribbon supply system of FIG. 5, viewed from the top and the front.
Figure 7:
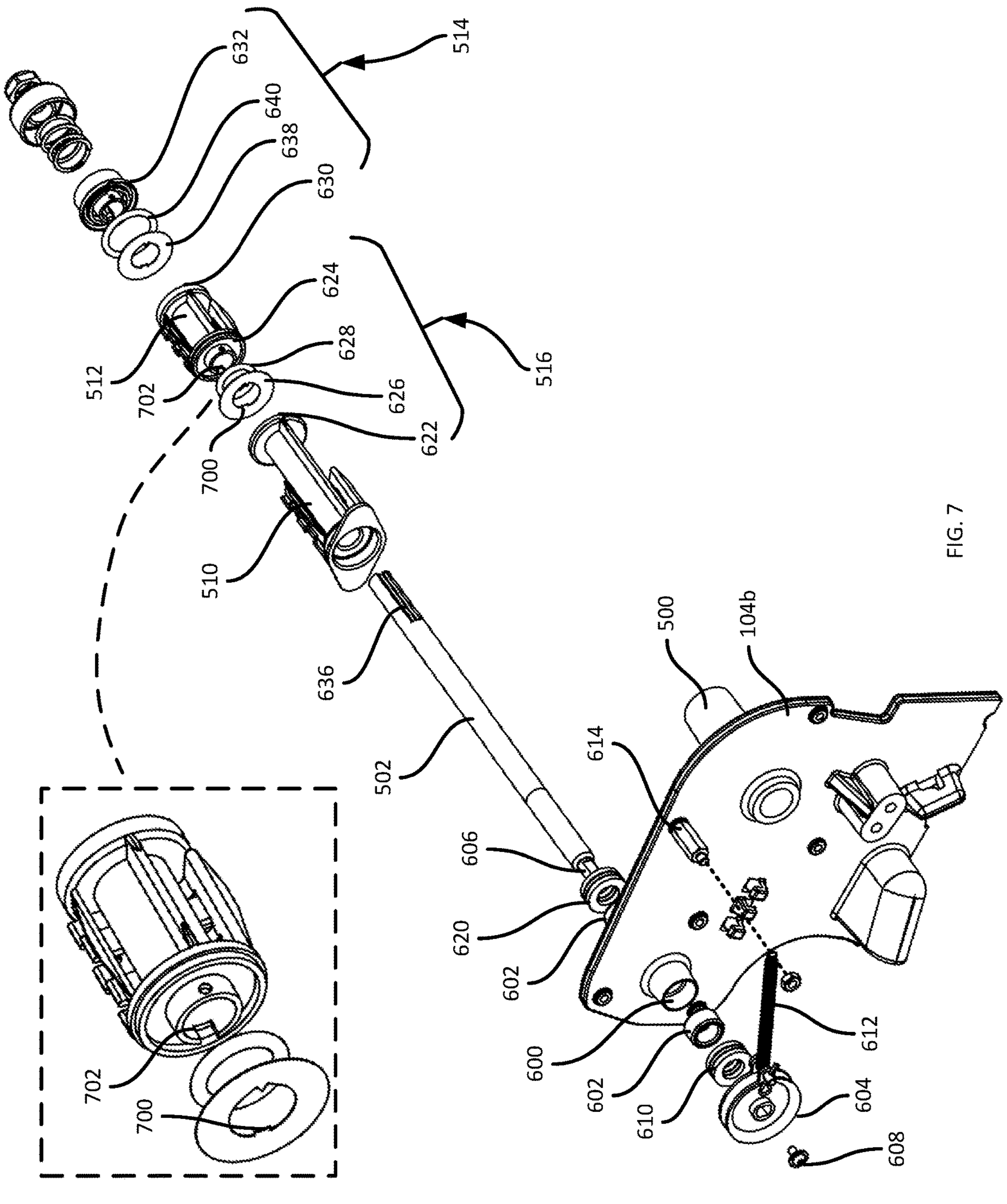
FIG. 7 is an exploded view of the ribbon supply system of FIG. 5, viewed from the top and the rear.

Referring now to FIGS. 6-7, which show exploded views of the ribbon supply system 128, and FIG. 8 which shows a cross-sectional view of the ribbon supply system 128, additional components of the system 128 will be discussed. The shaft 502 is supported for rotation by the subframe 104*b* by way of a channel 600 defined through the channel portion 506 of the subframe 104*b*. The shaft 502 extends through the channel 600, and is rotatably supported within the channel by one or more bearing assemblies, such as the pair of needle bearing assemblies 602 illustrated, which are inserted into respective ends of the channel 600.

A first section of the shaft 502, referred to as the pulley section, extends from one end of the channel 600 (the far end as illustrated in FIG. 6, and the near end as illustrated in FIG. 7) and supports components of the tensioning mechanism 408. In particular, the tensioning mechanism 408 includes a pulley 604 affixed to the shaft 502. That is, the pulley 604 is fixed to the shaft 502 to prevent the pulley 604 and the shaft 502 from rotating independently of one another. For example, the shaft 502 can include a flattened end 606 configured to engage with a corresponding aperture of the pulley 604 to prevent relative rotation of the pulley 604 and the shaft 502. The pulley 604 may be retained on the shaft 502 by a fastener 608 such as a screw threaded into an end of the shaft 502. A bearing assembly, such as a thrust bearing 610, between the pulley 604 and the subframe 104*b*, permits rotation of the pulley 604 relative to the subframe 104*b*.

In addition to the pulley 604, the tensioning mechanism 408 includes a bias member 612 such as a coil spring. In other embodiments, the bias member 612 can be implemented as a band of rubber or other resilient material, a torsion spring, or the like. One end of the bias member 612 is affixed to a perimeter of the pulley 604 via an anchor affixed to the pulley, and the other end of the bias member 612 is affixed to the subframe 104*b*, e.g. by a fastener connecting the end of the bias member 612 to a post 614 extending from the subframe 104*b*. Various other forms of bias members may also be employed. In general, as will be apparent through the discussion herein, the bias member 612 applies a torque to the pulley 604 in the opposite direction from a direction of rotation of the pulley 604. That is, the bias member 612 resists rotation of the pulley 604; when the resistance applied by the bias member 612 reaches a threshold determined by the clutch 514 or the clutch 516 (depending on the width of the spool 124), the clutch 514 or 516 slips, permitting the spindle 508 (i.e. either both segments 510 and 512, or the segment 510 alone) to rotate independently of the shaft 502, while the shaft 502 remains stationary.

The spindle segments 510 and 512, as well as the clutches 514 and 516 and the tension setting mechanism 518, are carried on a second section of the shaft 502, also referred to as the spindle section. The spindle section of the shaft 502 is the portion of the shaft extending beyond the channel 600 in an opposite direction from the pulley section (i.e. on the opposite side of the subframe 104*b* from the pulley 604). The spindle segments 510 and 512 each include a set of blades 616 and 618 configured to engage with an interior of the ribbon spool 124 and retain the ribbon spool 124, such that the spool 124 and the segments 510 and 512 rotate with the spool 124. The proximal segment 510 is rotatably supported about the shaft 502 by a bearing assembly, such as a thrust bearing 620 mounted adjacent to the subframe 104*b* at an opening of the channel 600.

The auxiliary clutch 516 includes a first auxiliary clutch member 622 affixed to the proximal segment 510. In particular, in the present example, the first auxiliary clutch member 622 is integrally formed with the proximal segment 510, in the form of an annular ridge extending axially from the proximal segment 510. In other examples, the first auxiliary clutch member 622 can be implemented as a separate component that is fastened to the proximal segment 510. The auxiliary clutch 516 also includes a second auxiliary clutch member 624 affixed to the distal segment 512. In the present example, the second auxiliary clutch member 624 is integrally formed with the distal segment 512, in the form of an annular surface facing toward the proximal segment 510. The auxiliary clutch 516 also includes, in the illustrated example, a wear plate 626 affixed to the distal segment 512 (e.g. by complementary notches 700 and 702 shown in FIG. 7) and a wear plate support such as an O-ring 628 between the second auxiliary clutch member 624 and the wear plate 626. The second auxiliary clutch member 624, O-ring 628 and wear plate 626 therefore either transmit rotation of the proximal segment 510 to the distal segment 512, or permit the proximal segment 510 to rotate independently of the distal segment 512 (i.e. with the distal segment 512 remaining stationary when the first auxiliary clutch member 622 slips against the wear plate 626).

The clutch 514 includes a first clutch member 630 affixed to the distal segment 512. In particular, in the present example, the first clutch member 630 is integrally formed with the distal segment 512, in the form of an annular ridge extending axially from the distal segment 512. In other examples, the first clutch member 630 can be implemented as a separate component that is fastened to the distal segment 512. The clutch 514 also includes a second clutch member 632 affixed to the shaft 502. In the present example, the second clutch member 632 is an annular component with one or more ridges 634 that engage with corresponding grooves 636 of the shaft 502 to prevent relative rotation of the second clutch member 632 and the shaft 502.

The clutch 514 also includes, in the illustrated example, a wear plate 638 affixed to the second clutch member 632 and an O-ring 640 between the second clutch member 632 and the wear plate 638. The second clutch member 632, O-ring 640 and wear plate 638 therefore either transmit rotation of the distal segment 512 to the shaft 502, or permit the distal segment 512 to rotate while the shaft 502 remains stationary (when the first clutch member 630 slips against the wear plate 638).

Figure 8:
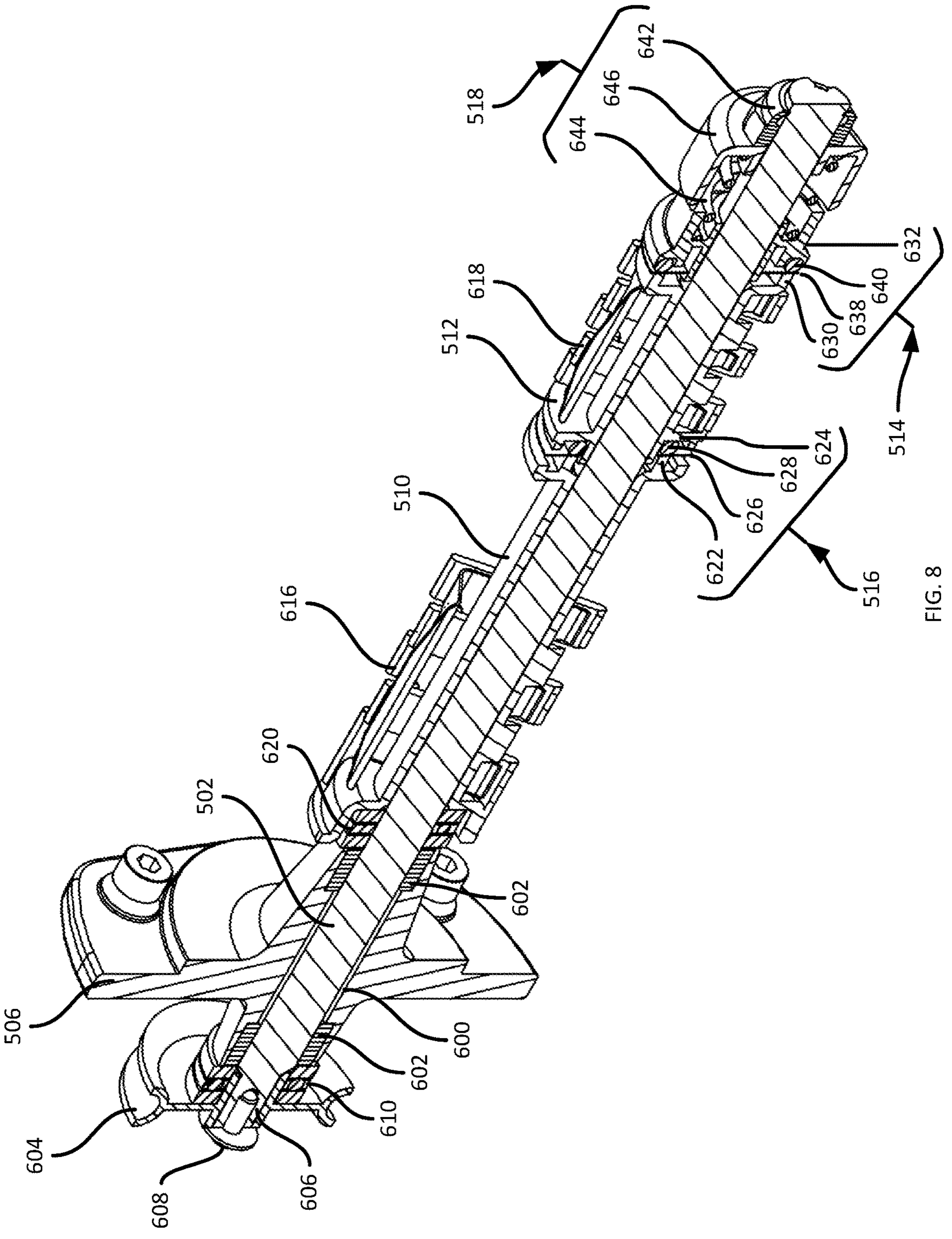
FIG. 8 is a cross-sectional view of the ribbon supply system of FIG. 5, taken at the plane F8.

As will be apparent from FIGS. 6, 7 and 8, the surface area of contact between the wear plate 638 and the first clutch member 630 is larger than the area of contact between the wear plate 626 and the first auxiliary clutch member 622. Specifically, the diameter of the first auxiliary clutch member 622 is smaller than the diameter of the first clutch member 630. The auxiliary clutch 516 therefore begins to slip more easily than the clutch 514 (i.e. when a smaller torque is applied to the shaft 502 by the tensioning mechanism 408). In other words, each of the clutches 514 and 516 establishes a threshold torque beyond which the respective clutch 514 or 516 will slip.

The above-mentioned thresholds can be altered by operation of the tension setting mechanism 518. Specifically, the tension setting mechanism 518 includes a set nut 642 threaded onto an end of the shaft 502. Tightening the set nut 642 (i.e. towards the channel portion 506 of the subframe **104*b*) shifts a cap 646 towards the channel portion 506 of the subframe 104*b*, and compresses a spring 644. The spring 644 thus applies a greater pressure on the second clutch member 632, which in turn results in greater pressure exerted by the wear plates 638 and 626 on the first clutch member 630 and the first auxiliary clutch member 622, respectively. Such increased pressure raises the torque thresholds beyond which the clutches 514 and 516 begin to slip. In some examples, the mechanism 518 can include a stop (not shown) limiting the degree to which the set nut 642** can be tightened.

Figure 9A:
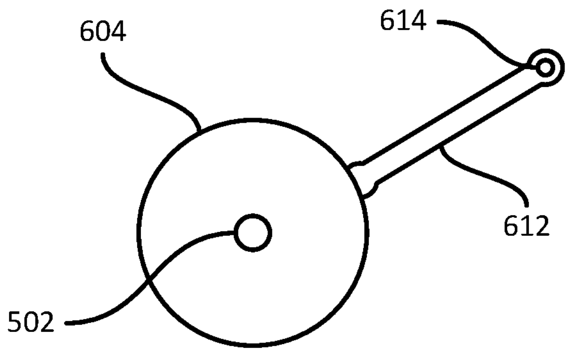
FIGS. 9A, 9B and 9C are diagrams illustrating the tensioning mechanism of the ribbon supply system of FIG. 5.
Figure 9B:
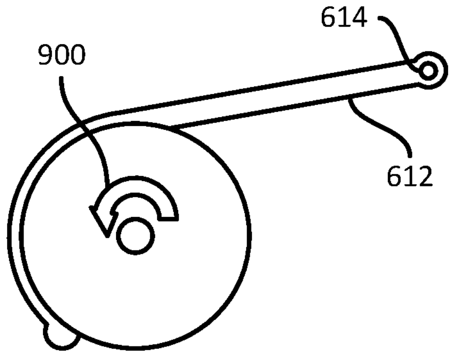
Figure 9C:
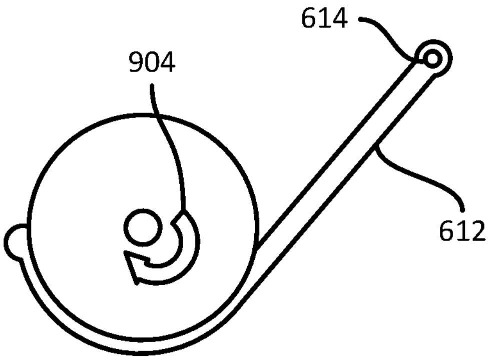

Referring now to FIGS. 9A-9C, the operation of the tensioning mechanism 408 will be described in greater detail. FIG. 9A illustrates the pulley 604 and the bias member 612 in a resting position, with the bias member 612 applying no tension, or minimal tension, to the pulley 604. In addition, any tension in the bias member 612 in the resting state shown does not apply torque to the shaft 502.

When the printer 100 begins operation, the motor 400 drives the take-up roller 132, which pulls the ribbon and in turn drives the spindle 508 (specifically, either the proximal spindle segment 510 alone or both spindle segments 510 and 512, depending on the width of the ribbon spool 124). Via the clutch 514 or the auxiliary clutch 516, the shaft 502 therefore also begins to rotate, as does the pulley 604. Rotation of the pulley 604 in a first direction 900 or a second direction 904, as shown in FIGS. 9B and 9C respectively, elongates the bias member 612 and wraps the bias member 612 around the pulley 604. As a result of the elongation of the bias member 612, the bias member applies a torque to the pulley 604 in opposite to the direction 900 or 904. Further, the torque applied increases as the pulley 604 rotates in the direction 900 or 904. When the torque exceeds the threshold set by the clutch 514 or 516, the clutch 514 or 516 begins to slip, and the bias member 612 remains in its current elongated state, thus maintaining a given level of tension in the ribbon.

When the motor 400 ceases driving the take-up roller 132, the ribbon no longer applies the same degree of torque on the spindle 508. The torque applied by the bias member 612 therefore exceeds the torque applied to the spindle 508 by the ribbon. The bias element 612 may therefore retract partially toward the resting position, rotating the shaft 502 independently of the spindle 508 (which remains stationary as the ribbon is effectively immobilized by the take-up roller 132 and by the ribbon and media mated at the printhead 116). This recoil action of the bias member 612 serves to maintain tension in the ribbon when the printer 100 is not operating, without over-tensioning the ribbon during such downtime. Such recoil action also maintains tension in the ribbon during backfeed operation, to rotate the spindle assembly and the spool 124 in the opposite direction as that shown in FIGS. 2 and 3.

Figure 10A:
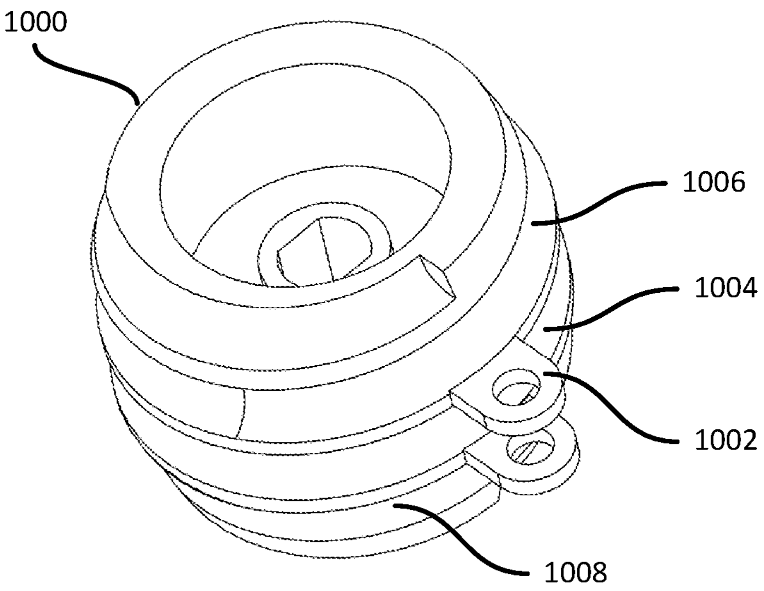
FIGS. 10A and 10B are isometric and side views of a pulley of the ribbon supply system of FIG. 5, according to another embodiment.
Figure 10B:
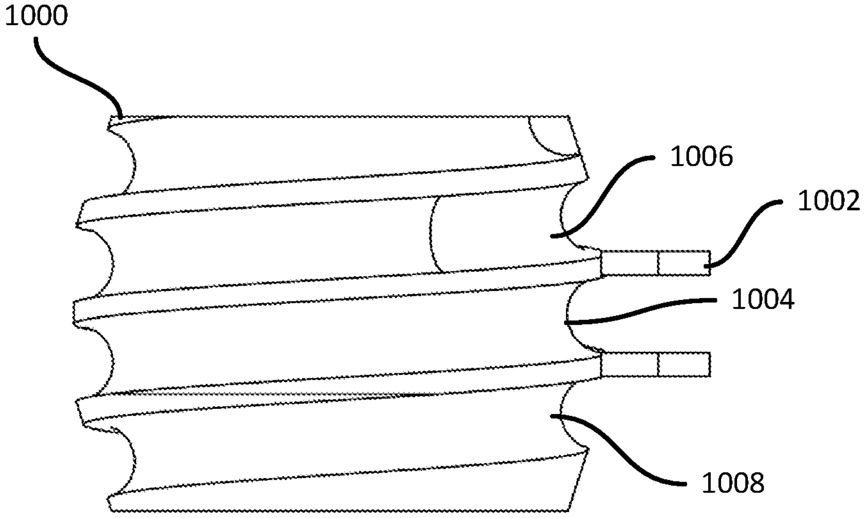

Variations to the above are contemplated, in addition to those mentioned above. For example, referring to FIGS. 10A and 10B, a modified pulley 1000 is illustrated. The pulley 1000 includes an anchor 1002 for the bias member 612. As will be apparent to those skilled in the art, the pulley 604 permits only a single winding of the bias member 612. The pulley 1000, by contrast, includes a central track 1004, as well as at least two auxiliary tracks 1006 and 1008 on either side of the central track 1004. The bias member 612 can therefore, in response to rotation of the pulley 1000, wind around a portion of the central track 1004 (which portion being determined by the direction of rotation of the pulley 1000), and then wind around either of the auxiliary tracks 1006 and 1008, permitting a greater range of torques to be applied by the bias member 612. Additional tracks may also be provided in other embodiments, subject to limitations such as the proximity of other components of the printer 100, the size of the printer 100 and the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A bidirectional ribbon supply system for a printer, comprising:

a shaft supported by a frame of the printer, the shaft to rotate about an axis;

a pulley affixed to the shaft, the pulley includes a central track and an auxiliary track adjacent to the central track; and a bias member coupled between the frame and the pulley to apply a force to the pulley in either of a first direction or a second direction in response to rotation of the pulley in the other of the first or second direction, the bias member winding around a portion of the central track of the pulley and continuing to wind around a portion of the auxiliary track in response to rotation of the pulley.

2. The ribbon supply system of claim 1, further comprising:

a spindle supported on the shaft, a take-up roller is configured to be operatively coupled to the spindle operative to transmit rotation of the take-up roller to the spindle to rotate the spindle in the first direction according to a first print configuration and to rotate the spindle in the second direction according to a second print configuration; and a clutch including (i) a first clutch member affixed to the spindle, and (ii) a second clutch member affixed to the shaft and engaging the first clutch member to transmit rotation of the spindle to the shaft until a torque applied to the pulley by the bias member reaches a threshold.

3. The ribbon supply system of claim 2, wherein:

the first clutch member is further configured to slip against the second clutch member when the torque exceeds the threshold, such that the spindle rotates independently of the shaft, the first clutch member is integrated into an end of the spindle; and wherein the second clutch member is adjacent to the end of the spindle, and the clutch further includes a wear plate engaging the first clutch member and a spring pressing the second clutch member against the wear plate to define the threshold.

4. The ribbon supply system of claim 3, further comprising a tension setting mechanism to variably set a level of compression of the spring.

5. The ribbon supply system of claim 2, wherein the spindle includes a proximal spindle segment supported adjacent to the frame, and a distal spindle segment supported between the proximal spindle segment and the second clutch member; and wherein the distal spindle segment carries the first clutch member.

6. The ribbon supply system of claim 5, further comprising an auxiliary clutch including a first auxiliary clutch member on the proximal spindle segment, and a second auxiliary clutch member affixed to the distal spindle segment and engaging with the first auxiliary clutch member to transmit rotation of the proximal spindle segment to the distal spindle segment until the torque applied to the pulley by the bias member reaches the threshold.

7. The ribbon supply system of claim 1, wherein:

the shaft extends through a channel in the frame, the channel contains a bearing assembly rotatably supporting a shaft, the pulley is affixed to the shaft on a first side of the channel, and the spindle is supported about the shaft on a second side of the channel.

8. The ribbon supply system of claim 1, wherein the bias member includes a coil spring with a first end affixed to a perimeter of the pulley and a second end affixed to the frame.

9. A printer, comprising:

a printhead;

a frame;

a ribbon supply spool;

a shaft supported by the frame and carrying the ribbon supply spool, the shaft configured to rotate about an axis;

a pulley affixed to the shaft, the pulley includes a central track and an auxiliary track adjacent to the central track; and a bias member coupled between the frame and the pulley to apply a force to the pulley in either of a first direction or a second direction in response to rotation of the pulley in the other of the first or second direction, the bias member winding around a portion of the central track of the pulley and continuing to wind around a portion of the auxiliary track in response to rotation of the pulley.

10. The printer of claim 9, further comprising:

a spindle supported on the shaft, the spindle supports the ribbon supply spool on the shaft, a take-up roller transmits rotation to the spindle via the ribbon supply spool to rotate the spindle in the first direction according to a first print configuration and to rotate the spindle in the second direction according to a second print configuration; and a clutch including (i) a first clutch member affixed to the spindle, and (ii) a second clutch member affixed to the shaft and engaging the first clutch member to transmit rotation of the spindle to the shaft until a torque applied to the pulley by the bias member reaches a threshold.

11. The printer of claim 10, wherein:

the first clutch member is further configured to slip against the second clutch member when the torque exceeds the threshold, such that the spindle rotates independently of the shaft, the first clutch member is integrated into an end of the spindle; and wherein the second clutch member is adjacent to the end of the spindle, the clutch further includes a wear plate engaging the first clutch member and a spring pressing the second clutch member against the wear plate to define the threshold.

12. The printer of claim 11, further comprising a tension setting mechanism to variably set a level of compression of the spring.

13. The printer of claim 9, wherein:

the shaft extends through a channel in the frame, the channel contains a bearing assembly rotatably supporting the shaft, and the pulley is affixed to the shaft on a first side of the channel, and wherein the spindle is supported about the shaft on a second side of the channel.

14. The printer of claim 9, further comprising:

a clutch including (i) a first clutch member, and (ii) a second clutch member; and a spindle including a proximal spindle segment supported adjacent to the frame, and a distal spindle segment supported between the proximal spindle segment and the second clutch member, the bias member includes a coil spring with a first end affixed to a perimeter of the pulley and a second end affixed to the frame, and the distal spindle segment carries the first clutch member.

15. The printer of claim 14, further comprising an auxiliary clutch including a first auxiliary clutch member on the proximal spindle segment, and a second auxiliary clutch member affixed to the distal spindle segment and engaging with the first auxiliary clutch member to transmit rotation of the proximal spindle segment to the distal spindle segment until a torque applied to the pulley by the bias member reaches the threshold.

16. A method in a printer, the method comprising:

supporting a shaft on a frame of the printer to rotate about an axis, wherein a pulley is affixed to the shaft;

causing rotation of a ribbon supply spool carried by a spindle supported on the shaft in either of a first direction or a second direction;

at a bias member operatively coupled to the pulley, responsive to rotation of the ribbon supply spool in either of the first or second direction, applying a force to the pulley in the other of the first or second direction, the bias member winding around a portion of a central track of the pulley and continuing to wind around a portion of an auxiliary track of the pulley in response to rotation of the pulley.

17. The method of claim 16, further comprising:

engaging the first clutch member as a clutch to transmit rotation of the spindle to the shaft until a torque applied to the pulley by the bias member reaches a threshold.

18. The method of claim 17, further comprising:

allowing the first clutch member to slip against a second clutch member of the clutch when the torque exceeds the threshold, such that the spindle rotates independently of the shaft.

* * * * *